United States Patent

[11] 3,603,160

[72] Inventor Joseph Lewis Bloom
 Baie D'Urfe, Quebec, Canada
[21] Appl. No. 779,346
[22] Filed Nov. 27, 1968
[45] Patented Sept. 7, 1971
[73] Assignee Joseph Lucas (Industries) Limited
 Birmingham, England

[54] SPEED CONTROL FOR GAS TURBINE ENGINES
 4 Claims, 1 Drawing Fig.
[52] U.S. Cl. ................................................ 73/541
[51] Int. Cl. ................................................ G01p 3/16
[50] Field of Search .................................... 73/540,
 541, 543; 60/39.28

[56] References Cited
 UNITED STATES PATENTS
 3,111,809 11/1963 Bierwirth .................... 60/39.28
 3,348,375 10/1967 Gardner et al. .............. 60/39.28
 3,382,673 5/1968 Mowbray .................... 73/543 X
 FOREIGN PATENTS
 175,724 2/1922 Great Britain ................ 73/543

Primary Examiner—James J. Gill
Attorney—Holman & Stern

ABSTRACT: A governor mechanism for controlling the speed of a gas turbine engine comprising a spring means arranged to control the resistance to movement of governor elements, a plurality of pistons independently actuable to control the spring force through lever mechanisms, the pistons being connected by cams and followers, whereby they can be operated independently or in combination.

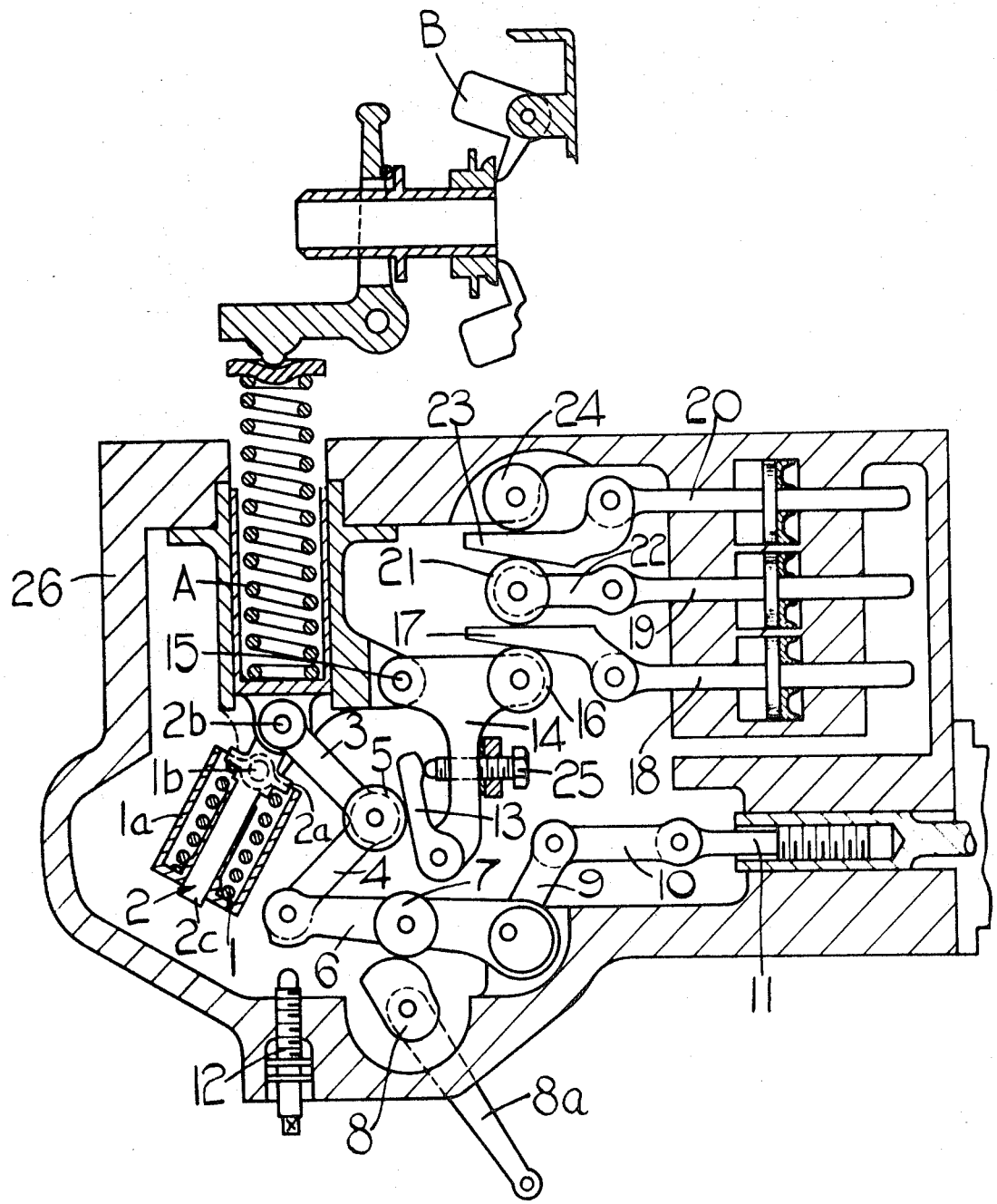

SPEED CONTROL FOR GAS TURBINE ENGINES

This invention relates to fuel control systems for gas turbine engines and has particular, though not exclusive, relation to a governor mechanism for controlling fuel supply and thus the speed of an aircraft engine installation under certain conditions, examples of these conditions being:

a. when increased power is desired for short distance take off or landing, the possible maximum speed which the engine can reach has to be increased, b. when increased water/methanol injection is required to increase mass flow through the engine and hence thrust from the engines, the possible maximum speed which the engine can reach has to be increased in order to maintain jet pipe temperature, c. when air is being supplied from the engine to control surfaces on the aircraft, this usually being referred to as boundary layer control, possible maximum speed which the engine can reach has to be decreased.

An object of the present invention is to provide a convenient governor mechanism for controlling the speed of a gas turbine engine under certain conditions, independently or in conjunction with one another.

According to the present invention there is provided a governor mechanism for controlling the speed of a gas turbine engine comprising spring means arranged to provide an adjustable resistance to movement of centrifugally operable governor elements, to control fuel flow to the engine, a lever mechanism operable to control the spring force resistance, and a plurality of independently actuable pistons arranged to control the spring force resistance and hence engine speed, through the intermediary of the lever mechanism, each of said pistons being interconnected by a system of cams and cam followers whereby any one of said pistons can be operated independently of the others, or in combination.

An embodiment of the invention will now be described, by way of example, with reference to the accompanying drawing which is a diagrammatic representation of top speed governor mechanism for controlling the speed of a gas turbine engine for an aircraft.

Referring to the drawing, the mechanism shown is part of a fuel control system for a gas turbine engine, which includes a set of governor weights whereby fuel flow to the engine is controlled. A spring 1 acts on an axially slidable spring-loaded plunger A to provide a resistance to movement of the governor weights which are of the centrifugal type, in such manner as to limit the maximum speed which the engine can reach. The spring 1 acts between the closed end of an enclosing cup $1a$ of at $1b$ to a lug on the end of the fixed cylinder in which the piston A slides. The cylinder is fixed relatively to a body 26 of the apparatus. The opposite end of the spring 1 acts against a flange $2a$ on a spindle 2. The spindle 2 is pivotally connected at $2b$ onto the plunger A, at which point, lever 3 is also pivotally connected. The free end $2c$ of the spindle 2 remote from the pivot $2b$ is slidably engaged in a long bearing sleeve formed integrally in the interior of the cup $1a$. The other end of the lever 3 is pivotally connected to a lever 4 and a roller 5 is provided at this junction. The lower end of the lever 4 is pivotally connected to a lever 6 which carries a roller 7 intermediate its ends and which engages a cam 8 connected through a link $8a$ to a pilot-operated lever. The other end of the lever 6 is connected through further levers 9, 10 to a rod 11 which is connected with a part movable in accordance with changing temperature in the jet pipe of the engine. In use, axial movement of the rod 11 takes place in accordance with changes in the jet pipe temperature, such movement being intended to control the engine speed through the described lever system.

A screw adjustment 12 is provided to control the idling speed of the engine by limiting the travel of the lever 6 in an anticlockwise direction about its pivot axis.

Abutting against the roller 5 is a cam 13 pivoted at its lower end to one arm of a bellcrank lever 14. The bellcrank lever 14 acts about a pivot 15 and its other arm carries a roller 16 which engages a cam surface on a cam 17 pivotally mounted at the end of a hydraulically operated piston 18 associated with a water/methanol injection system (not shown) of the engine. Extending parallel to the piston 18 are two further pistons 19, 20, the piston 19 being associated with the boundary layer control mechanism and carrying a roller 21 through the intermediary of arm 22 which is pivotally attached to piston 19. The roller 21 is slidable axially of the piston between the cam 17 and a cam surface on a cam 23 pivotally carried by the piston 20 which is operable in order to increase power for short distance takeoff or landing of the aircraft. The cam 23 is slidable between the roller 21 and a fixed roller 24.

The three pistons 18, 19 and 20 are each controllable by the aircraft pilot.

The bell crank lever 14 is provided with a screw adjustment 25 which positions the cam 13 to permit variation of he rating of the governor spring 1.

With the above arrangement, increase in power for short takeoff or landing can be effected by actuation of piston 20; decrease in engine speed for boundary layer control can be effected by actuation of piston 19; and increase in engine speed to accommodate water/methanol injection can be effected by piston 18.

For example, if the piston 20 is to be operated independently of pistons 18 and 19, the cam 23 is moved to the left as shown in the drawing. Due to action of the cam surface on the cam 23 against the roller 21, the latter is urged downwardly together with the cam 17 and the roller 16 to pivot the bellcrank lever 14 about its pivot 15. In doing so the associated cam 13 urges the roller 5 to the left. Such movement of the roller 5 causes the plunger A to move upwards, as drawn. Because the spindle 2 is pivotally connected to the plunger and because the cup $1a$ is on a fixed pivot $1b$ not connected to the plunger A, the spring 1 and the cup $1b$ will pivot in an anticlockwise direction. This will relax the spring to change the force which it exerts to resist the tendency of the centrifugal governor weights to operate to increase fuel supply and thus to increase engine speed.

If on the other hand decrease in engine speed is desired in relation to boundary layer control, the reverse procedure takes place on operation of piston 19. The piston 19 is moved to the left as shown in the drawing and this permits the bellcrank lever 14 to pivot in an anticlockwise direction which in turn allows the roller 5 to move to the right and so pivot the spring 1 and its associated spindle 2 and cup $1a$ in a clockwise direction and to move the plunger downwards to decrease the resistance against the centrifugal governor weights and so decrease engine speed.

Actuation of piston 18 effects a control similar to that effected by piston 20.

In addition to independent control of the three pistons 18, 19 and 20, it will be apparent that any two or all three can be operated simultaneously and in this case an engine maximum speed setting is obtained which is determined by the compound motion of a plurality of the pistons.

Having thus described my invention what I claim as new and desire to secure by letters Pat. is:

1. A governor mechanism for controlling the speed of a gas turbine engine comprising a speed-responsive device, means for controlling the supply of fuel to the engine in accordance with said speed-responsive device, a plunger slidably mounted in a fixed body, means connecting the plunger with the speed-responsive device, spring means acting on the plunger, the spring means acting at one end through a pivot, on the plunger and, at its other end through a further pivot, on a fixed part of the body, a lever mechanism pivotally connected to the plunger at the end thereof at which the spring means acts, movement of said lever mechanism moving the plunger which causes the spring means to be moved angularly to adjust the force which it applies to the plunger, to control the speed-responsive device, a plurality of cams acting upon the lever mechanism and a plurality of independently operable pistons connected to the cams respectively to control their positions, to control the position of the lever mechanism.

2. A governor mechanism as claimed in claim 1 which the lever mechanism comprises a first lever pivotally connected at one end to the plunger, a roller carried at the other end of said first lever, a cam on which the roller acts, the cam being carried on a pivoted bell crank lever which is positioned by the plurality of cams associated with the pistons respectively.

3. A governor mechanism as claimed in claim 1 which the lever mechanism has a manually operable means whereby it can be adjusted independently of the pistons.

4. A governor mechanism as claimed in claim 1 in which the lever mechanism has a further associated control whereby it can be adjusted independently of said pistons.